United States Patent
Krishnaswamy et al.

(10) Patent No.: US 10,983,763 B2
(45) Date of Patent: Apr. 20, 2021

(54) GENERATING SCALABLE AND CUSTOMIZABLE LOCATION INDEPENDENT AGILE DELIVERY MODELS

(71) Applicant: Tata Consultancy Services Limited, Mumbai (IN)

(72) Inventors: Subramanian Krishnaswamy, Chennai (IN); Janardhan Santhanam, Chennai (IN); Mohammed Musthafa Soukath Ali, Chennai (IN); Ramanathan Murali, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 35 days.

(21) Appl. No.: 16/700,560

(22) Filed: Dec. 2, 2019

(65) Prior Publication Data
US 2020/0174759 A1    Jun. 4, 2020

(30) Foreign Application Priority Data
Nov. 30, 2018    (IN) .............................. 201821045379

(51) Int. Cl.
*G06F 9/44* (2018.01)
*G06F 8/35* (2018.01)
(Continued)

(52) U.S. Cl.
CPC .................. *G06F 8/35* (2013.01); *G06F 8/22* (2013.01); *G06F 8/427* (2013.01); *G06F 9/541* (2013.01);
(Continued)

(58) Field of Classification Search
CPC ....................................................... G06F 9/44
See application file for complete search history.

(56) References Cited

U.S. PATENT DOCUMENTS

2009/0150197 A1* 6/2009 Strauss ............ G06Q 10/06398
705/7.42
2015/0205582 A1* 7/2015 Iskander .................. G06F 8/70
717/105
(Continued)

OTHER PUBLICATIONS

Shrivastava, S.V. et al. (May 2010). "Distributed Agile Software Development: A Review," *Journal of Computer Science and Engineering*, vol. 1, issue 1; pp. 10-17.
(Continued)

*Primary Examiner* — Jae U Jeon
(74) *Attorney, Agent, or Firm* — Finnegan, Henderson, Farabow, Garrett & Dunner, LLP (57) ABSTRACT

This disclosure relates to modeling an Agile team structure such that it aligns with Agile principles, achieve synergy and deliver intended business benefits. Current approach to modelling depends on unproven manually arrived patterns that do not predict benefits, are based on limited number of experts utilizing heuristics from personal experience. Once a working model is derived, it is refined over time which is a slow process with no verification of its effectiveness. In accordance with the present disclosure, scalable and customizable location independent Agile delivery models can be generated using a palette based user interface such that constraints are optimized. A pre-configured meta-model is chosen and the location independent model is generated given the constraints. A compliance indicator provides a degree of compliance with the Agile principles. The model is then evaluated using machine learning models that have been trained by leveraging a knowledge base of successfully implemented Agile models.

15 Claims, 7 Drawing Sheets

(51) Int. Cl.
  *G06F 16/242* (2019.01)
  *G06F 16/29* (2019.01)
  *G06F 8/20* (2018.01)
  *G06F 8/41* (2018.01)
  *G06F 9/54* (2006.01)
  *G06N 5/02* (2006.01)

(52) U.S. Cl.
  CPC .......... *G06F 16/2433* (2019.01); *G06F 16/29* (2019.01); *G06N 5/022* (2013.01)

(56) References Cited

U.S. PATENT DOCUMENTS

2015/0278781 A1* 10/2015 Ewing .................. G06Q 20/108
  705/42
2016/0103912 A1* 4/2016 Daggett ................. G16H 50/70
  707/736

OTHER PUBLICATIONS

Nisum Technologies, Inc. (Aug. 2017). "Agile Models for Global Teams," retrieved from https://www.agilealliance.org/wp-content/uploads/2016/07/Agile_White-Paper_web_2.6MB.pdf (22 pages).

AIM Consulting (Jul. 2017). "12 Best Practices for Distributed Development Teams Using Agile and Scrum Methodologies," retrieved from https://aimconsulting.com/insights/blog/12-best-practices-distributed-development-teams-using-agile-scrum-methodologies/ (11 pages).

* cited by examiner

GENERATING SCALABLE AND CUSTOMIZABLE LOCATION INDEPENDENT AGILE DELIVERY MODELS

PRIORITY CLAIM

This U.S. patent application claims priority under 35 U.S.C. § 119 to: Indian Patent Application No. 201821045379, filed on 30 Nov. 2018. The entire contents of the aforementioned application are incorporated herein by reference.

TECHNICAL FIELD

The disclosure herein generally relates to distributed Agile team models, and, more particularly, to systems and computer implemented methods for generating scalable and customizable location independent Agile delivery models.

BACKGROUND

Agile is a methodology by which a team delivers value faster and better than the competition when a customer wants the value, thereby meeting the needs of the customer in a sustainable, safe and high quality mode. Adhering to the values and principles of Agile captured in 'The Agile Manifesto' results in small Agile development team, often less than 10 members. The team works very closely with the business in short time frame, often in weeks, to deliver an increment of functionality. The team augments or refines the functionality over several iterations. Agile promotes a human friendly way of working involving simplicity, small team, experimentation, and mutual empathy. A key catalyst of Agile is the co-location of all the members in the small team. Co-location is explicitly demanded in one of the Agile principles, 'The most efficient and effective method of conveying information to and within a development team is face-to-face conversation'.

Its more than 17 years since publication of the Agile Manifesto. There are marked changes in the way organizations work today. Companies have grown in size, even spread to different continents/time zones. Many large enterprises have skilled professionals of all kinds all over the world who need to collaborate to develop organization capabilities. Hence, co-location of all Agile teams is not practical for many enterprise efforts.

SUMMARY

Embodiments of the present disclosure present technological improvements as solutions to one or more of the above-mentioned technical problems recognized by the inventors in conventional systems.

In an aspect, there is provided a processor implemented method for generating scalable and customizable location independent Agile delivery models, the method comprising the steps of: receiving, by one or more hardware processors, data pertaining to one or more Agile project accounts, wherein the step of receiving comprises: one-time seeding of header attributes pertaining to the one or more Agile project accounts; and receiving periodic updates of performance parameters pertaining to the one or more Agile project accounts; registering, by the one or more hardware processors, the one or more Agile project accounts, in a Knowledge Repository, for initial master data setup and for the periodic updates being received; updating, by the one or more hardware processors, the Knowledge Repository with the received data, wherein the step of updating comprises: processing the received data asynchronously, wherein the processing comprises parsing key-value pairs comprised therein, and wherein the keys are fields and the values correspond to the header attributes and the performance parameters; validating the values prior to sending through an Application Programming Interface (API) for updating the Knowledge Repository; dynamically constructing a set of query language statements based on the validated values; and executing the set of query language statements to update the Knowledge Repository with the validated values; training, by the one or more hardware processors, one or more machine learning models using the validated values; and interactively generating a potential location independent Agile delivery model, by the one or more hardware processors, using a visual modeling technique, wherein the potential location independent Agile delivery model is interactively generated by: self-registering a new project account upon receiving the header attributes, wherein at least some of the header attributes serve as constraints for generation of a new location independent Agile delivery model; dynamically presenting to a user, a palette based user interface comprising a plurality of pre-configured meta-models, selectable components and interconnections thereof; displaying a minimum set of selectable components based on a user selected instantiation of one of the plurality of pre-configured meta-models; and dynamically updating a compliance indicator in response to every drag or drop of the components being selected that generates a corresponding potential location independent Agile delivery model by optimally managing the constraints, wherein the compliance indicator is indicative of a degree of compliance with Agile principles; and identifying a potential location independent Agile delivery model having at least a user-defined minimum degree of compliance with Agile principles as the new location independent Agile delivery model.

In another aspect, there is provided a system for generating scalable and customizable location independent Agile delivery models, the system comprising: one or more data storage devices operatively coupled to one or more hardware processors and configured to store instructions configured for execution by the one or more hardware processors to: receive data pertaining to one or more Agile project accounts, wherein the data is received by: one-time seeding of header attributes pertaining to the one or more Agile project accounts; and receiving periodic updates of performance parameters pertaining to the one or more Agile project accounts; registering, the one or more Agile project accounts, in a Knowledge Repository, for initial master data setup and for the periodic updates being received; updating, the Knowledge Repository with the received data by: processing the received data asynchronously, wherein the processing comprises parsing key-value pairs comprised therein, and wherein the keys are fields and the values correspond to the header attributes and the performance parameters; validating the values prior to sending through an Application Programming Interface (API) for updating the Knowledge Repository; dynamically constructing a set of query language statements based on the validated values; and executing the set of query language statements to update the Knowledge Repository with the validated values; training one or more machine learning models using the validated values; and interactively generating a potential location independent Agile delivery model, using a visual modeling technique, wherein the potential location independent Agile delivery model is interactively generated by: self-registering a new project account upon receiving the header attributes, wherein at least some of the header attributes serve as constraints for generation of a new location independent Agile delivery model; dynamically presenting to a user, a palette based user interface comprising a plurality of pre-configured meta-models, selectable components and interconnections thereof; displaying a minimum set of selectable components based on a user selected instantiation of one of the plurality of pre-configured meta-models; and dynamically updating a compliance indicator in response to every drag or drop of the components being selected that generates a corresponding potential location independent Agile delivery model by optimally managing the constraints, wherein the compliance indicator is indicative of a degree of compliance with Agile principles; and identifying a potential location independent Agile delivery model having at least a user-defined minimum degree of compliance with Agile principles as the new location independent Agile delivery model.

In yet another aspect, there is provided a computer program product comprising a non-transitory computer readable medium having a computer readable program embodied therein, wherein the computer readable program, when executed on a computing device, causes the computing device to: receive data pertaining to one or more Agile project accounts, wherein the data is received by: one-time seeding of header attributes pertaining to the one or more Agile project accounts; and receiving periodic updates of performance parameters pertaining to the one or more Agile project accounts; registering, the one or more Agile project accounts, in a Knowledge Repository, for initial master data setup and for the periodic updates being received; updating, the Knowledge Repository with the received data by: processing the received data asynchronously, wherein the processing comprises parsing key-value pairs comprised therein, and wherein the keys are fields and the values correspond to the header attributes and the performance parameters; validating the values prior to sending through an Application Programming Interface (API) for updating the Knowledge Repository; dynamically constructing a set of query language statements based on the validated values; and executing the set of query language statements to update the Knowledge Repository with the validated values; training one or more machine learning models using the validated values; and interactively generating a potential location independent Agile delivery model, using a visual modeling technique, wherein the potential location independent Agile delivery model is interactively generated by: self-registering a new project account upon receiving the header attributes, wherein at least some of the header attributes serve as constraints for generation of a new location independent Agile delivery model; dynamically presenting to a user, a palette based user interface comprising a plurality of pre-configured meta-models, selectable components and interconnections thereof; displaying a minimum set of selectable components based on a user selected instantiation of one of the plurality of pre-configured meta-models; and dynamically updating a compliance indicator in response to every drag or drop of the components being selected that generates a corresponding potential location independent Agile delivery model by optimally managing the constraints, wherein the compliance indicator is indicative of a degree of compliance with Agile principles; and identifying a potential location independent Agile delivery model having at least a user-defined minimum degree of compliance with Agile principles as the new location independent Agile delivery model.

In accordance with an embodiment of the present disclosure, the header attributes comprise the data associated with Agile project account owner, industry, customer Agile maturity, portfolio, geographical locations, team size, team roles, functional domain, communication links, collaboration technologies and engineering maturity.

In accordance with an embodiment of the present disclosure, the selectable components are in the form of at least some of the header attributes including team roles, artifacts including product backlog and sprint backlog, time zones associated with the geographical locations, tooling enablers including Continuous Integration (CI) and Application Lifecycle Management (ALM).

In accordance with an embodiment of the present disclosure, the performance parameters comprise release frequency, velocity, functional quality, structural quality and post production defects.

In accordance with an embodiment of the present disclosure, the one or more machine learning models are based on algorithm, use case, input, solution, output or traceability.

In accordance with an embodiment of the present disclosure, the new location independent Agile delivery model is in the form of a graph based on the selected components and wherein the geographical locations serve as nodes, the header attributes serve as node attributes and the communication links serve as edges.

In accordance with an embodiment of the present disclosure, the one or more processors are further configured to perform at least one of: initiate evaluation of the new location independent Agile delivery model using the trained one or more machine learning models to output a set of the performance parameters of the new location independent Agile delivery model, wherein the performance parameters are indicative of a degree of optimization of the new location independent Agile delivery model; and output a best match for the new location independent Agile delivery model amongst one or more Agile delivery models corresponding to the one or more Agile accounts using either a regression method or a nearest neighbor method.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Agile way of working is a lightweight approach to product development compared to traditional process heavy approach such as waterfall. It involves direct collaboration between business and technical teams, small teams with problem solving focus leveraging rich interactions and collaboration, adaptive planning in short iterations and incremental deliveries for quick feedback. More Enterprises are shifting to Agile way of working to improve responsiveness to business needs. For a maximum benefit of Agile, it is essential for the Enterprises to apply Agile way of working across the entire product development team irrespective of their functional expertise or location. A major building block of such Enterprise Agile is the ability to scale Agility through Distributed Agile teams.

The challenge in designing a distributed Agile team model is the likelihood of the model to go out of compliance to Agile principles. For example, it is not uncommon to see an Agile Team that is split between locations where one team is dependent on another for accessing technology resources; violating the Agile principle of 'Give the environment and support to get the job done'. Specific challenges include:

Though the enterprises have explored various models of Distributed Agile, they depend on the experts' manual verification of compliance of such models to Agile principles.

Expert skills required for structuring the distributed Agile models do not scale when the distributed Agile team size becomes large or more locations get added.

Knowledge behind the distributed Agile model planning is not augmented in a systematic manner. Hence this results in pockets of excellence, not replicable or scalable across project/programs/enterprises with a variety of operating conditions.

Inability to simulate what-if-scenarios prior to making modifications to an Agile team structure, roles or operating characteristics resulting in a significant risk of failure.

Systems and methods of the present disclosure enable generating scalable and customizable location independent Agile delivery models as explained hereinafter to overcome the above mentioned technical challenges. The location independent Agile model, generated in accordance with the present disclosure, is a codified approach for Distributed Agile by design so that Agile teams across different locations can work together without compromising the Agile principles. In accordance with the present disclosure, various working models may be simulated and performance parameters may be estimated before the right model is identified and implemented in a real world scenario.

Referring now to the drawings, and more particularly to FIG. 1 through FIG. 4C, where similar reference characters denote corresponding features consistently throughout the figures, there are shown preferred embodiments and these embodiments are described in the context of the following exemplary system and/or method.

Figure 1:
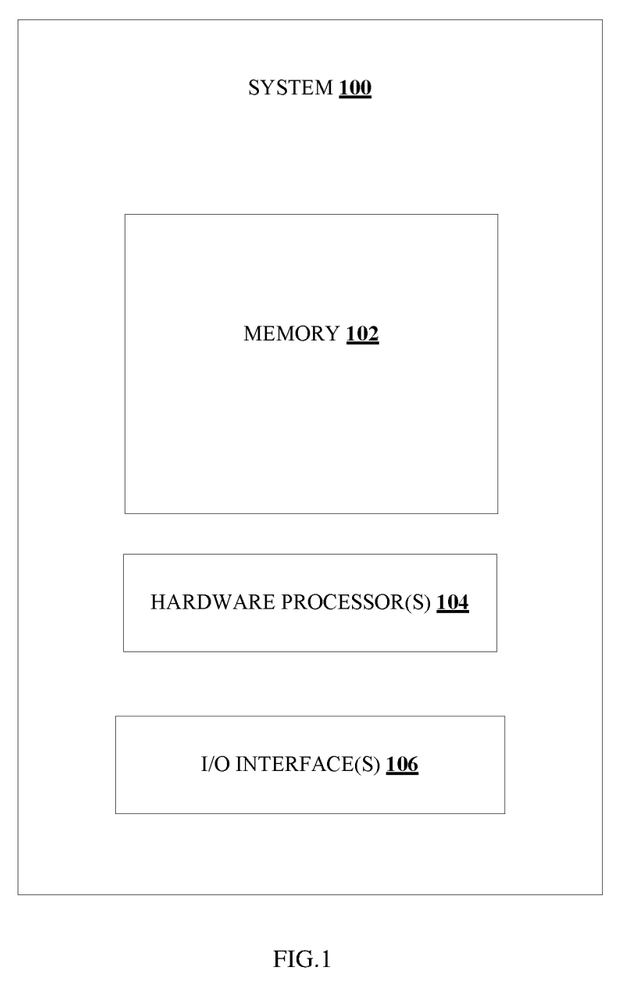
FIG. 1 illustrates an exemplary block diagram of a system for generating scalable and customizable location independent Agile delivery models, in accordance with an embodiment of the present disclosure.

FIG. 1 illustrates an exemplary block diagram of a system 100 for generating scalable and customizable location independent Agile delivery models, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (102A through 102C) of the system 100 can be stored in the memory 102.

Figure 2:
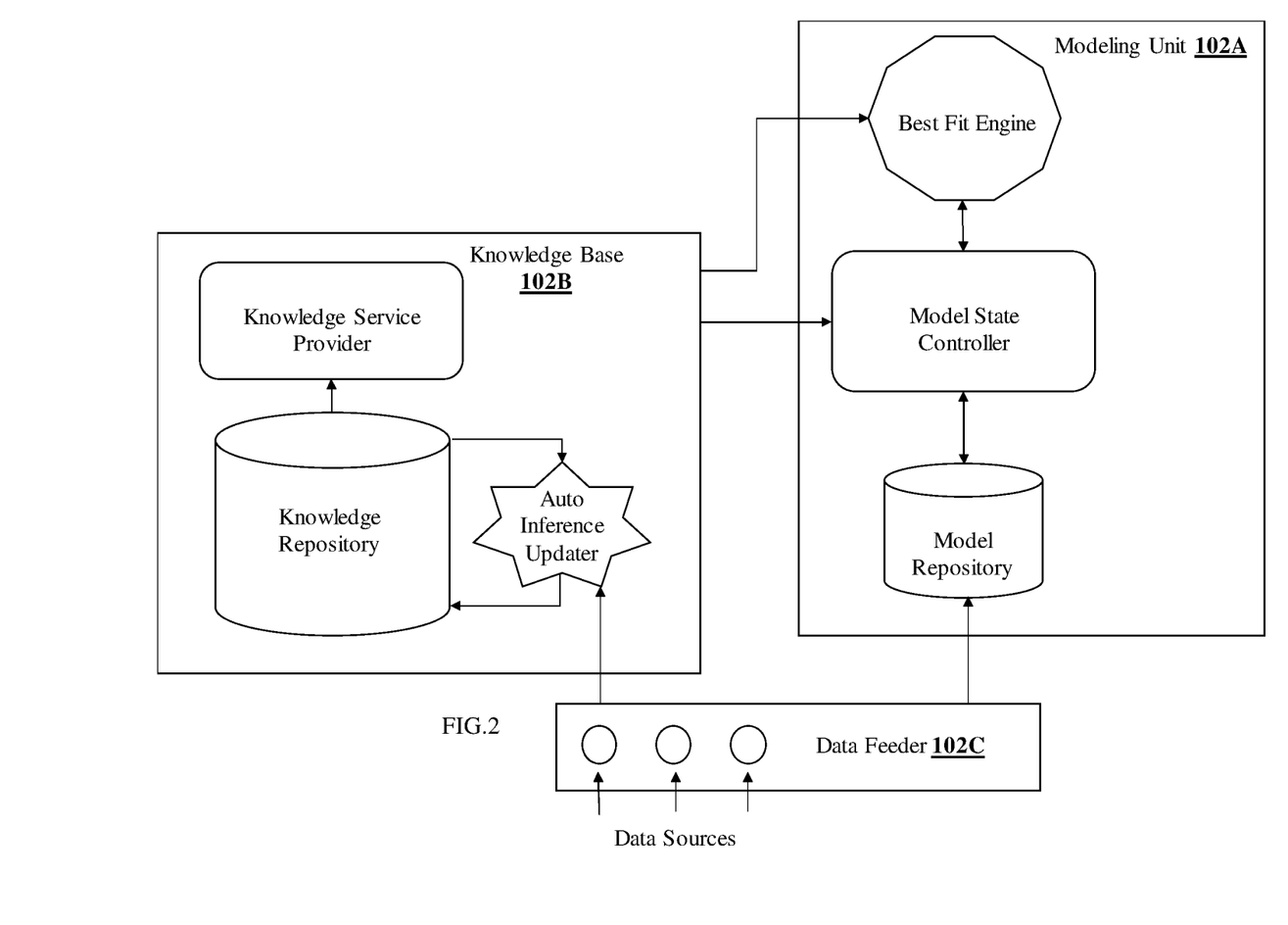
FIG. 2 illustrates exemplary functional modules comprised in the system of FIG. 1, in accordance with an embodiment of the present disclosure.

FIG. 2 illustrates exemplary functional modules comprised in the system of FIG. 1, in accordance with an embodiment of the present disclosure. A Modelling Unit 102A serves as an interface for user input and maintains the state of Agile delivery models. The Modelling Unit 102A primarily comprises a Best Fit Engine, a Model State Controller and a Model Repository. In accordance with the present disclosure, the Model State Controller tracks the state of the Agile delivery models in real time and orchestrates with the Best Fit Engine, the Model Repository and a Knowledge Base 102B described hereinafter. The Best Fit Engine is a stateless rules engine configured to acquire decision rules from the Knowledge Base 102B. The In an embodiment, the Model Repository is configured to store the state of the Agile delivery models. In Accordance with the present disclosure, the Model Repository is either a relational database or a graph-oriented database.

The Knowledge Base 102B is a synthesized knowledge bank comprising organized knowledge of historical data pertaining to one or more Agile project accounts to assess fitness of the Agile delivery models, recommend an optimal state, and provide intelligence needed for analytics (step 212 described hereinafter). In an embodiment, the knowledge base 102B comprises a Knowledge Repository, a Knowledge Service Provider and an Auto Inference Updater. The Auto Inference Updater is a self-learning mechanism that continuously polls the Knowledge Repository and re-organizes inferences from emerging patterns. The Auto Inference Updater is a refresher and tuning engine that keeps the Knowledge Repository updated and functional. The Knowledge Service Provider includes a set of Application Programming Interfaces (APIs) that expose services to utilize the Knowledge Base 102B. In accordance with the present disclosure, the Knowledge Repository may have a graph oriented structure or a document oriented structure.

In accordance with the present disclosure, a Data Feeder 102C is provided for receiving inputs from a plurality of data sources. The Data Feeder 102C is configured to interact with multiple sources and convert the received inputs into a format readable by the Auto Inference Updater of the Knowledge Base 102B.

Figure 3:
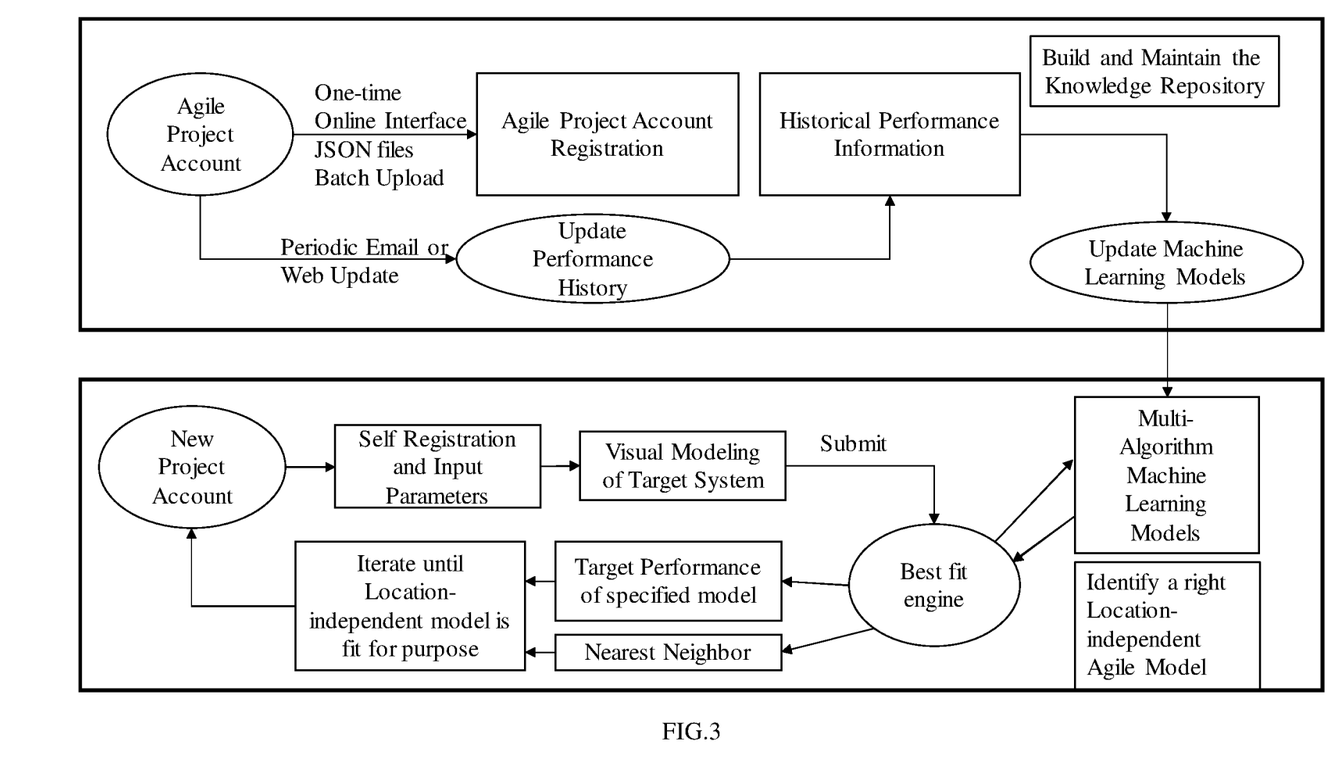
FIG. 3 illustrates a high level flow chart of a method for generating scalable and customizable location independent Agile delivery models, in accordance with an embodiment of the present disclosure.
Figure 4A:
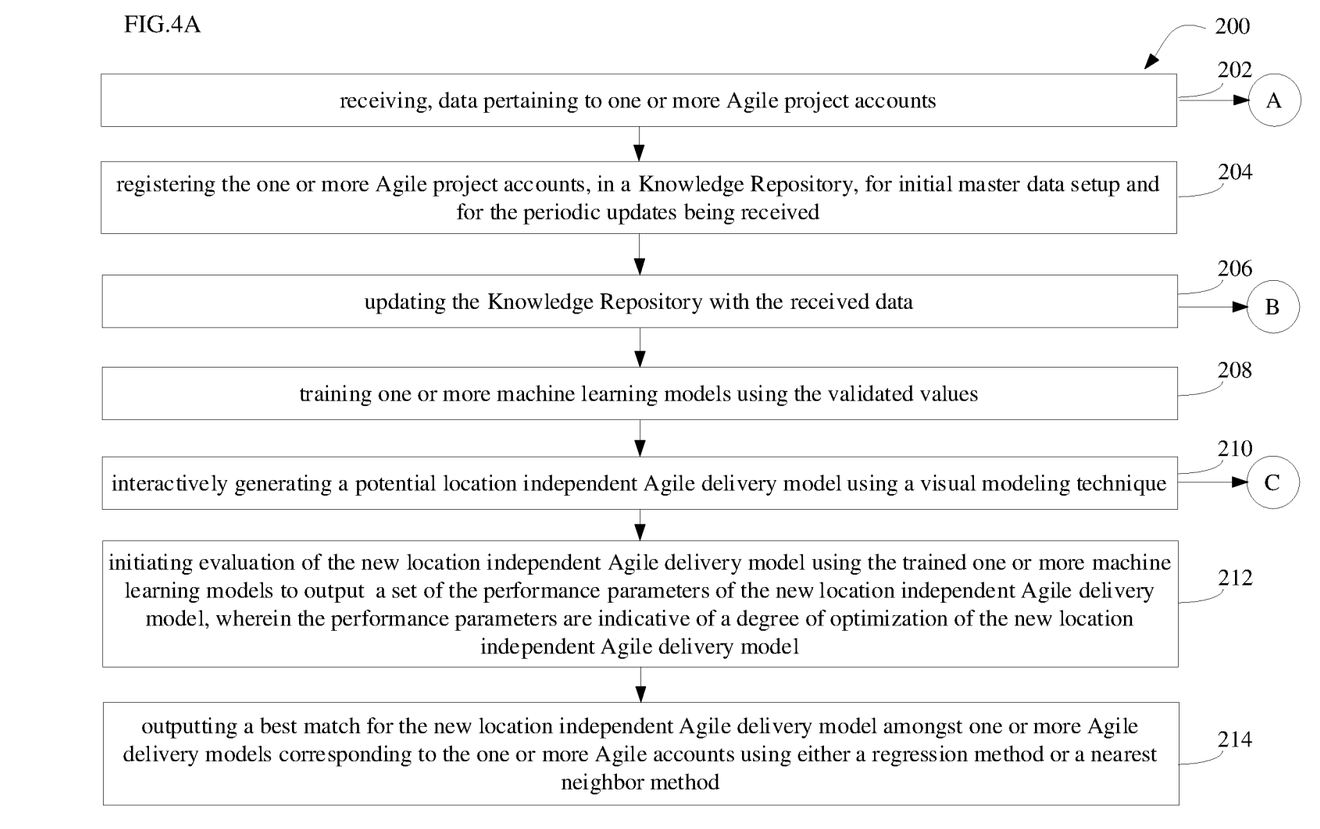
FIG. 4A through FIG. 4C illustrates an exemplary flow diagram of a computer implemented method for generating scalable and customizable location independent Agile delivery models, in accordance with an embodiment of the present disclosure.
Figure 4B:
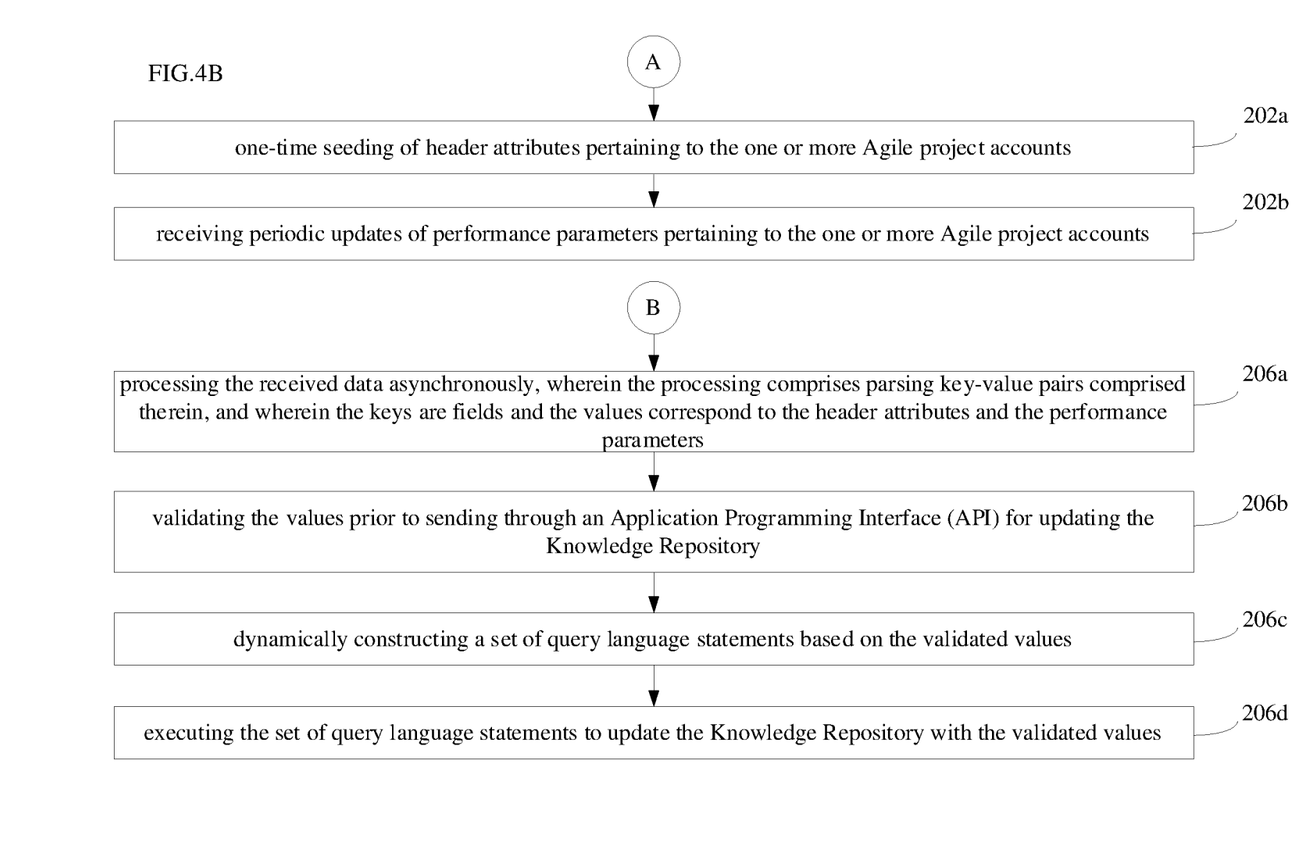
Figure 4C:
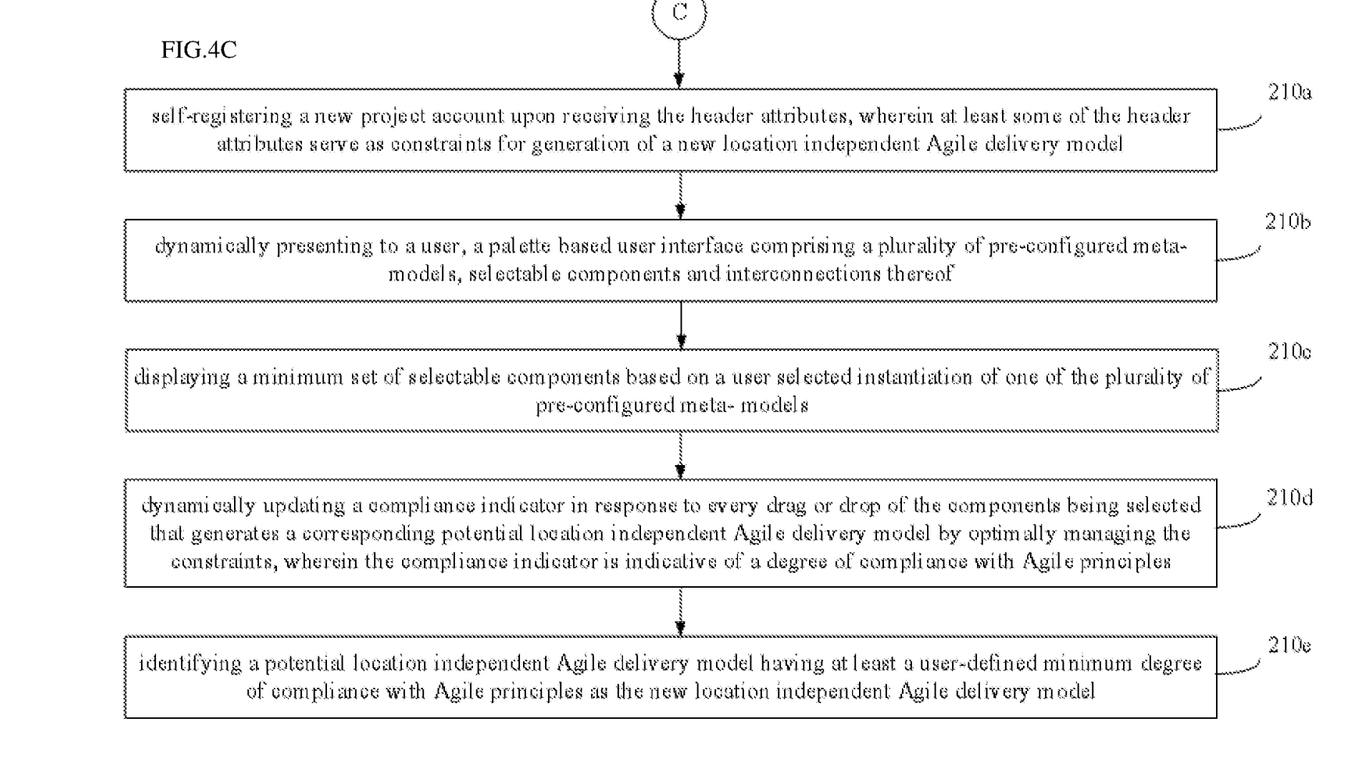

FIG. 3 illustrates a high level flow chart of a method for generating scalable and customizable location independent Agile delivery models, in accordance with an embodiment of the present disclosure. FIG. 4A through FIG. 4C illustrate an exemplary flow diagram of a computer implemented method 200 for generating scalable and customizable location independent Agile delivery models, in accordance with an embodiment of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the high level flow chart of FIG. 3 and the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the method 200 comprises two parts, wherein a first part is related to building and maintaining the Knowledge Repository and a second part is related to identifying a right location independent Agile delivery model.

In accordance with an embodiment of the present disclosure, in the first part of the method 200, the one or more processors 104 (constituting the Knowledge Base 102B and the Data Feeder 102C) are configured to receive, at step 202, data pertaining to one or more Agile project accounts. In an embodiment, the step 202 of receiving data comprises one-time seeding of header attributes pertaining to the one or more Agile project accounts, at step 202a and receiving periodic updates of performance parameters pertaining to the one or more Agile project accounts at step 202b. In an embodiment, the header attributes comprise the data associated with Agile project account owner, industry, customer Agile maturity, portfolio, geographical locations, team size, team roles, functional domain, communication links, collaboration technologies and engineering maturity. In an embodiment, the performance parameters comprise release frequency, velocity, functional quality, structural quality and post production defects, wherein the release frequency and velocity may be a single metric, while the other data may include multiple metrics. For instance, the functional quality may include regression defects, system test defects, and the like. Again structural quality may include static code analyses violations, code complexity, and the like. In an embodiment, two JavaScript Object Notation (JSON) data structures (XML, CSV, XLS) may be defined to model the Agile delivery models. In an embodiment, the data may be received via the Data Feeder 102C through bulk upload. Alternatively, a web interface such as Hypertext Markup Language (HTML) may be provided for online entry, wherein the Data Feeder 102C is configured to convert the data to a desired format.

In accordance with an embodiment the present disclosure, the one or more processors 104 are configured to register, at step 204, the one or more Agile project accounts in the Knowledge Repository, for initial master data setup and for the periodic updates being received, the periodicity of the update being monthly, quarterly, etc., wherein the cadence may be pre-defined. In an embodiment, for each registered one or more Agile project accounts, the periodic updates (JSON files) may be shared as electronic mail attachments by utilizing a publish-subscribe pattern. For HTML input, online update to the Knowledge Repository may be executed.

In accordance with an embodiment the present disclosure, the one or more processors 104 are configured to update, at step 206, the Knowledge Repository with the data received at step 202. The step 206 of updating the Knowledge Repository may comprise firstly processing the received data asynchronously (no wait for upstream message clearance/network latency/network failure, wherein a message broker (MB) handles messages suitably) at step 206a. In an embodiment, the step of processing comprises parsing key-value pairs comprised therein, wherein the keys are fields and the values correspond to the header attributes and the performance parameters. At step 206b, the values are validated prior to sending through an Application Programming Interface (API) for updating the Knowledge Repository. For instance, if an electronic mail attachment is received, the attachments may be downloaded into a designated secure location and then validated to check if the Agile project account is registered, the sender may be validated, the data may be validated for valid values. In an embodiment, if the data is valid, an acknowledgement may be sent to the sender. Alternatively, an error message rejecting the received data may be sent. The validated data is then sent into an input queue through the API for updating the Knowledge Repository. At step 206c, a set of query language statements are dynamically constructed based on the validated values. For instance, when the Knowledge Repository is graph oriented, query language such as SPARQL™, Cypher™, Gremlin™, and the like may be used. Alternatively, when the Knowledge Repository is document oriented, query language such as Structured Query Language (SQL), JSON, and the like may be used. Finally, at step 206d, the set of query language statements are executed to update the Knowledge Repository with the validated values. Dynamic construction of the query language statements provides flexibility in structure of the Knowledge Repository.

In accordance with an embodiment the present disclosure, the one or more processors 104 (constituting the Knowledge Base 102B and the Data Feeder 102C) are configured to train, at step 208, one or more machine learning models using the validated values from step 206. Each new data received, triggers the Auto Inference Updater of the Knowledge Base 102B which is an automatic machine learning engine that scans the new data and updates the one or more machine learning models in the Model Repository of the Modeling unit 102A, thereby enabling learning taking historical data as the input and providing performance parameters as an output as explained hereinafter. In an embodiment, the one or more machine learning models are based on algorithm, use case, input, solution, output or traceability. For instance, the one or more machine learning models based on algorithm may involve neural networks or deep learning; based on use case may be regression or classification; based on input may be supervised technique; based on output may be a probabilistic model; and the like.

Figure 5:
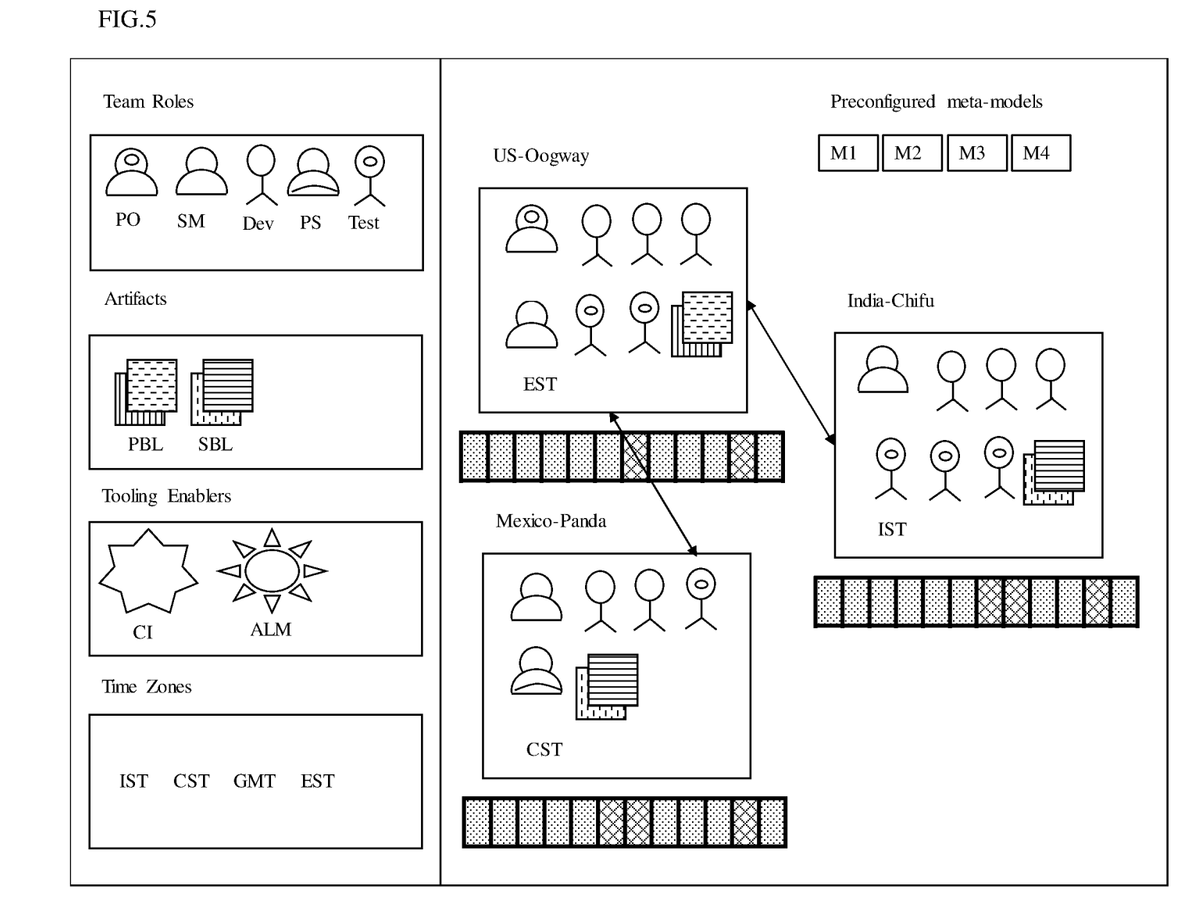
FIG. 5 illustrates a palette based user interface for generating scalable and customizable location independent Agile delivery models, in accordance with an embodiment of the present disclosure.

In accordance with an embodiment of the present disclosure, in the second part of the method 200, a right location independent Agile delivery model is identified for a new project account. The one or more processors 104 (constituting the Modeling Unit 102A) are configured to interactively generate, at step 210, a potential location independent Agile delivery model using a visual modeling technique. The potential location independent Agile delivery model is interactively generated by firstly self-registering the new project account, at step 210a, upon receiving the header attributes. In accordance with the present disclosure, at least some of the header attributes serve as constraints for generation of a new location independent Agile delivery model. A palette based user interface comprising a plurality of pre-configured meta-models, selectable components and associated interconnections are then dynamically presented to a user, at step 210b. FIG. 5 illustrates a palette based user interface for generating scalable and customizable location independent Agile delivery models, in accordance with an embodiment of the present disclosure. In an embodiment, as illustrated in FIG. 5, the selectable components are in the form of at least some of the header attributes including team roles (Product Owner PO, Scrum Master SM, Developer Dev, Product Specialist PS, Tester Test), artifacts including Product Backlog (PBL) and Sprint Backlog (SBL), time zones (IST, CST, GMT, EST) associated with the geographical locations, tooling enablers including Continuous Integration (CI) and Application Lifecycle Management (ALM).

The user then instantiates one of the plurality of pre-configured meta-models based on which a minimum set of selectable components are displayed at step 210c. The user may drag or drop the selectable components into the instantiated pre-configured meta-model. In response to each drag or drop of the components being selected, a compliance indicator (shown as a bar below each location in FIG. 5) is dynamically updated, at step 210d. Every modification made to the instantiated pre-configured meta-model results in a corresponding potential location independent Agile delivery model. In accordance with the present disclosure, the compliance indicator is indicative of a degree of compliance with Agile principles. In an embodiment, the system 100 may have pre-identified mandatory principles that cannot be averted. In an exemplary embodiment of FIG. 5, there are 12 blocks in the bar that illustrate the 12 principles of Agile. The Agile principles that are not violated are represented by blocks having a cross pattern whereas the principles that are adhered to are represented by blocks having a dotted pattern. The visual model thus provides the user with an indication of the degree of compliance with Agile principles thereby enabling the user to further modify the potential location independent Agile delivery model such that the constraints are optimally managed. The potential location independent Agile delivery model having at least a user-defined minimum degree of compliance with Agile principles may then be identified as the new location independent Agile delivery model at step 210e.

In an embodiment, the new location independent Agile delivery model is in the form of a graph based on the selected components, wherein the geographical locations serve as nodes, the header attributes serve as node attributes and the communication links serve as edges.

In accordance with an embodiment of the present disclosure, the method 200 follows a 3-4-5 approach for generation of the new location independent Agile delivery model by instantiating a meta-model from a set of 4 pre-configured meta-models (M1, M2, M3, M4 of FIG. 5) given 3-dimensional constraints and further maturing the new location independent Agile delivery model through 5 activities. In an embodiment, the 3-dimensional constraints include the following:

1. Presence of business knowledge among distributed teams—lower the business knowledge, less is the possibility of significantly distributed agile teams.

2. Presence of program non-negotiable(s) such as extreme volatility in business requirements changing intra-day and needing an immediate response—higher the program non-negotiable(s), less is the possibility of significantly distributed agile teams.

3. Presence of a common base Agile way of working—Lack of a common minimal working framework limits the ability to distribute teams across locations. More the consistency in applying agile across the organization, higher the possibility of achieving distributed agile teams.

In accordance with the 3-4-5 approach, the 4 pre-configured meta-models (M1, M2, M3, M4) based on an analyses of the 3-dimensional constraints, in an exemplary embodiment are:

1. Model M1: Local—One team where the entire team is physically/virtually co-located. Agile development team members (Dev) require significant hand-holding by Product Owner (PO) to understand the business needs.

2. Model M2—Minimally distributed—Two Agile teams at two different locations. Each team is a full Agile development team. Product Owner is physically/virtually co-located with one of the teams. Some Agile development team members in the location where the PO is not present, are required to have basic business knowledge to interpret business needs articulated by the PO. The teams operate with each other leveraging common agile events.

3. Model M3—Significantly distributed—Multiple Agile teams at multiple locations. Each team is a full Agile development team. Some Agile development team members in each team have good business insights not only to interpret but also author low level requirement specifications based on the business needs articulated by the PO. The PO is physically/virtually co-located with one of the teams. The teams operate with each other leveraging common agile events. FIG. 5 is an exemplary illustration of Model M3.

4. Model M4—Fully distributed—Multiple Agile teams at multiple locations. Each team is a full Agile Development Team. At least one Agile development team member in each team is a Product Specialist (PS). The PS possesses enough business expertise to author detailed business needs based on the high level direction set by the PO. The PO is not required to be co-located with any of the teams. The teams operate with each other leveraging common agile events.

In the context of the present disclosure, the expression 'location' or 'geography' may refer not only to a city or country, but also to a facility or different floors of a facility. Accordingly, even team operating on different floors of the same building may be considered as distributed. However, merely distributing an Agile team across locations does not qualify as distributed Agile. In accordance with the present disclosure, following rules need to be adhered to qualify distributed locations as virtually collocated and thus meeting the Agile requirement:

Rule 1: Team members need to share at least 4 hours of time-zone overlap.

This is naturally possible for most of the teams except those whose team members are in geographically opposite locations, for example Mumbai vs Chicago. In that case teams may try partial movement of their work shift, say 12 pm to 9 pm.

But, full-shifting (members in one location moving to night shifts) is not recommended.

Rule 2: Ensure the workplace provides infrastructure, so team members can collaborate/communicate as good as physical collocation (right collaboration tools).

Rule 3: Establish team norms of communication between different locations ('one team culture'). An experienced coach or facilitator need to walk all the teams through potential tricky scenarios such as misunderstandings due to written languages, repeated absence of some team members in common events, offensive behavior, mistakes in choosing right medium of communication, difference in opinion on estimations, design, decisions, etc. All team members together need to build the norms to handle such exceptions.

Again, in accordance with the present disclosure, collocation does not imply one Agile team. An Agile team, in accordance with the present disclosure, meets two conditions:

Condition 1: All the team members need to share a common work goal, for instance, 'creating a product catalog page'.

Condition 2: All the team members need to work closely throughout the day and sync up at least thrice a day.

Thus, it may be possible to have one or more Agile teams within a single project, though all the members are collocated.

In accordance with the present disclosure, scaling is achieved with the location independent Agile delivery model by adding more Agile teams within a team that is assigned to a project. The Agile teams may work from different locations with no need for physical collocation, however, the rules of virtual collocation need to be adhered by the Agile teams. The pre-configured meta-models (M1, M2, M3, M4) described above are built using this team of teams concept.

In accordance with the 3-4-5 approach, the 5 activities for maturing the new location independent Agile delivery model, in an exemplary embodiment are:

1. Build business knowledge at distributed locations so that Agile development team members may work with less dependencies on the POs.

2. Configure teams to take advantage of time-zone differences. Agile teams need a minimum overlap across time zones, for effective collaboration. Plan to calibrate team's work hours to ensure sustainable pace of work, so that as one team heads home from work, another team picks up the work to continue. The teams may decide the extent of overlap based on set of facts such as daily progress blockers.

3. Plan for "one team" culture and right collaboration tools—Teams across the enterprise share common Agile practices. They also enjoy similar privileges on computing resources (data setup, deployment, etc.) so that equal empowerment is made possible for teams from any location. Collaboration enablers may include tools that fully enable "virtual co-location" such as video-conferencing, shared white boarding, etc.

4. Synchronize and increase the automated flow of Sprint cycles and Release cycles—Choose the right sprint cycles to address business needs and synchronize with release cycles. Right levels of DevOps™ automation and engineering practices are made to improve the flow of work without mutual and external dependencies among the teams.

5. Plan the right distribution of work across locations such that dependencies across teams are minimized and the outflow is maximized.

In accordance with the exemplary 3-4-5 approach of the present disclosure, the dependency between the Development Team and the PO is treated as that between children and the mother. The teams without sufficient business understanding are children that depend on the mother, the PO. This is the case in M1 (Fully Co-located) model. The approach reduces this dependency gradually. For example, in M2, the teams develop enough business understanding so that they can quickly interpret business needs articulated by the PO. In M3, the teams can even derive detailed needs without depending on the PO. This increases the availability of the PO and enables the PO to support more teams.

Collaboration technologies have evolved a lot today since publication of the Agile Manifesto. In accordance with the present disclosure, knowledge of distribution models that work and that do not, their operating characteristics, knowledge around selecting a right model of distribution, know-how and experience in setting up the right parameters, contextual business knowledge and handling time zone overlaps have been leveraged to generate scalable and customizable location independent Agile delivery models.

In accordance with an embodiment of the present disclosure, once the new location independent Agile delivery model is identified, the user may choose to evaluate the performance of the identified model. Accordingly, the one or more processors 104 are configured to initiate evaluation, at step 212, of the new location independent Agile delivery model using the trained one or more machine learning models (at step 208) to output a set of the performance parameters of the new location independent Agile delivery model. In accordance with the present disclosure, the performance parameters are indicative of a degree of optimization of the new location independent Agile delivery model. The set of performance parameters provide the user with an indication of how the identified model will fare when implemented in a real world scenario. In the event that one or more performance parameters show better values compared to historical models, the architecture of the new location independent Agile delivery model may be updated in the Model Repository of the Modeling Unit 102A for future reference. In an embodiment, multiple passes (batch processes) may be performed for the different performance parameters constituting the set of performance parameters to compute the values of say release frequency, velocity, functional quality, structural quality, post-production defects, and the like. The user may use the performance parameters to make changes in terms of various resource utilization or planning to improve, modify or balance the computed performance parameters for the new location independent Agile delivery model generated by the user.

In accordance with another embodiment of the present disclosure, once the new location independent Agile delivery model is identified, the same may be compared with the one or more Agile delivery models in the Model Repository of the Modeling Unit 102A and a best match may be output, at step 214, using either a regression method or a nearest neighbor method to enable the user to compare the new location independent Agile delivery model with benchmarks set by different Agile model implementations and leverage best practice implementations that drive high performance.

Thus, in accordance with systems and methods of the present disclosure, there are three aspects to successfully implement location independent Agile delivery teams: Assessing the organization's distribution of business expertise, nature of work and Agile maturity; Choosing the right Agile delivery model to meet the organization's needs; and continuously improving the Agile capabilities of the Agile teams to gain the benefits of location independent Agile delivery models provided by the present disclosure.

Assessing the organization: If a location lacks business expertise, it will require more expertise to be able to support Agile teams there. As team members accumulate experience, they business knowledge may be built, making them both more valuable and more able to work as part of a distributed organization. At first, location-independent Agile teams may focus on work that is neither urgent nor volatile. If the work is both, if it has non-negotiable constraints (such as overnight fixes, intra-day scope changes, or regulatory requirements), or if there is a need for constant access to the PO, it's best to work with teams that are collocated, if at all possible. When teams are relatively new to Agile approaches, teams need to be collocated. Having a common understanding of Agile culture, especially among the leadership, indicates the organization can succeed with location-independent Agile delivery teams.

Choosing the right Agile delivery model: As explained, above, in an embodiment, one of the pre-configured meta-models (ranging from teams that should be collocated to those that can be effective in a highly distributed arrangement) may be selected for organizing the Agile teams.

| Pre-configured meta-models | | | | |
|---|---|---|---|---|
| | Model M1 | Model M2 | Model M3 | Model M4 |
| Business knowledge at Distributed location | Nil to Low | Medium to High | High | High |
| Nature/ Criticality of effort | Regulatory/ Urgent/ Volatile | All except Regulatory/ Urgent/ Volatile | All except Regulatory/ Urgent/ Volatile | All except Regulatory/ Urgent/ Volatile |
| Organization's experience in Agile way of working | Nil to Low | Low to Medium | Medium to High | High |

Some of the advantages of implementing the location independent Agile delivery models as observed in real world scenarios include: makes a distributed enterprise Agile, makes an enterprise more productive by leveraging 24 hours, five-days-a week coverage by selecting a right model from the available pre-configured meta-models and accelerates excellence by sharing skills across multiple teams independent of the location.

Improving the Agile capabilities of the Agile teams by maturing the new location independent Agile delivery model based on the 5 activities of the 3-4-5 approach described above.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for generating a scalable and customizable location independent Agile delivery model, the method comprising the steps of:
   receiving, by one or more hardware processors, data pertaining to one or more Agile project accounts, wherein the step of receiving comprises:
      one-time seeding of header attributes pertaining to the one or more Agile project accounts; and
      receiving periodic updates of performance parameters pertaining to the one or more Agile project accounts;
   registering, by the one or more hardware processors, the one or more Agile project accounts, in a Knowledge Repository, for initial master data setup and for the periodic updates being received;
   updating, by the one or more hardware processors, the Knowledge Repository with the received data, wherein the step of updating comprises:
      processing the received data asynchronously, wherein the processing comprises parsing key-value pairs comprised therein, and wherein the keys are fields and the values correspond to the header attributes and the performance parameters;
      validating the values prior to sending through an Application Programming Interface (API) for updating the Knowledge Repository;
      dynamically constructing a set of query language statements based on the validated values; and
      executing the set of query language statements to update the Knowledge Repository with the validated values;
   training, by the one or more hardware processors, one or more machine learning models using the validated values; and
   interactively generating a potential location independent Agile delivery model, by the one or more hardware processors, using a visual modeling technique, wherein the potential location independent Agile delivery model is interactively generated by:
      self-registering a new project account upon receiving the header attributes, wherein at least some of the header attributes serve as constraints for generation of a new location independent Agile delivery model;
      dynamically presenting to a user, a palette based user interface comprising a plurality of pre-configured meta-models, selectable components and interconnections thereof;
      displaying a minimum set of selectable components based on a user selected instantiation of one of the plurality of pre-configured meta-models;
      dynamically updating a compliance indicator in response to every drag or drop of the components being selected that generates a corresponding potential location independent Agile delivery model by optimally managing the constraints, wherein the compliance indicator is indicative of a degree of compliance with Agile principles; and
      identifying a potential location independent Agile delivery model having at least a user-defined minimum degree of compliance with Agile principles as the new location independent Agile delivery model.

2. The processor implemented method of claim 1, wherein the header attributes comprise the data associated with Agile project account owner, industry, customer Agile maturity, portfolio, geographical locations, team size, team roles, functional domain, communication links, collaboration technologies and engineering maturity.

3. The processor implemented method of claim 2, wherein the selectable components are in the form of at least some of the header attributes including team roles, artifacts including product backlog and sprint backlog, time zones associated with the geographical locations, tooling enablers including Continuous Integration (CI) and Application Lifecycle Management (ALM).

4. The processor implemented method of claim 1, wherein the performance parameters comprise release frequency, velocity, functional quality, structural quality and post production defects.

5. The processor implemented method of claim 1, wherein the one or more machine learning models are based on algorithm, use case, input, solution, output or traceability.

6. The processor implemented method of claim 1, wherein the new location independent Agile delivery model is in the form of a graph based on the selected components and wherein the geographical locations serve as nodes, the header attributes serve as node attributes and the communication links serve as edges.

7. The processor implemented method of claim 1 further comprising performing at least one of:
   initiating evaluation, by the one or more hardware processors, of the new location independent Agile delivery model using the trained one or more machine learning models to output a set of the performance parameters of the new location independent Agile delivery model, wherein the performance parameters are indicative of a degree of optimization of the new location independent Agile delivery model; and
   outputting, by the one or more hardware processors, a best match for the new location independent Agile delivery model amongst one or more Agile delivery models corresponding to the one or more Agile accounts using either a regression method or a nearest neighbor method.

8. A system comprising:
   one or more data storage devices operatively coupled to one or more hardware processors and configured to store instructions configured for execution by the one or more hardware processors to:
   receive data pertaining to one or more Agile project accounts, wherein the data is received by:
      one-time seeding of header attributes pertaining to the one or more Agile project accounts; and
      receiving periodic updates of performance parameters pertaining to the one or more Agile project accounts;

register, the one or more Agile project accounts, in a Knowledge Repository, for initial master data setup and for the periodic updates being received;
update, the Knowledge Repository with the received data by:
processing the received data asynchronously, wherein the processing comprises parsing key-value pairs comprised therein, and wherein the keys are fields and the values correspond to the header attributes and the performance parameters;
validating the values prior to sending through an Application Programming Interface (API) for updating the Knowledge Repository;
dynamically constructing a set of query language statements based on the validated values; and
executing the set of query language statements to update the Knowledge Repository with the validated values;
train one or more machine learning models using the validated values; and
interactively generate a potential location independent Agile delivery model, using a visual modeling technique, wherein the potential location independent Agile delivery model is interactively generated by:
self-registering a new project account upon receiving the header attributes, wherein at least some of the header attributes serve as constraints for generation of a new location independent Agile delivery model;
dynamically presenting to a user, a palette based user interface comprising a plurality of pre-configured meta-models, selectable components and interconnections thereof;
displaying a minimum set of selectable components based on a user selected instantiation of one of the plurality of pre-configured meta-models;
dynamically updating a compliance indicator in response to every drag or drop of the components being selected that generates a corresponding potential location independent Agile delivery model by optimally managing the constraints, wherein the compliance indicator is indicative of a degree of compliance with Agile principles; and
identifying a potential location independent Agile delivery model having at least a user-defined minimum degree of compliance with Agile principles as the new location independent Agile delivery model.

9. The system of claim 8, wherein the header attributes comprise the data associated with Agile project account owner, industry, customer Agile maturity, portfolio, geographical locations, team size, team roles, functional domain, communication links, collaboration technologies and engineering maturity.

10. The system of claim 9, wherein the selectable components are in the form of at least some of the header attributes including team roles, artifacts including product backlog and sprint backlog, time zones associated with the geographical locations, tooling enablers including Continuous Integration (CI) and Application Lifecycle Management (ALM).

11. The system of claim 8, wherein the performance parameters comprise release frequency, velocity, functional quality, structural quality and post production defects.

12. The system of claim 8, wherein the one or more machine learning models are based on algorithm, use case, input, solution, output or traceability.

13. The system of claim 8, wherein the new location independent Agile delivery model is in the form of a graph based on the selected components and wherein the geographical locations serve as nodes, the header attributes serve as node attributes and the communication links serve as edges.

14. The system of claim 8, wherein the one or more processors are further configured to perform at least one of:
initiate evaluation of the new location independent Agile delivery model using the trained one or more machine learning models to output a set of the performance parameters of the new location independent Agile delivery model, wherein the performance parameters are indicative of a degree of optimization of the new location independent Agile delivery model; and
output a best match for the new location independent Agile delivery model amongst one or more Agile delivery models corresponding to the one or more Agile accounts using either a regression method or a nearest neighbor method.

15. A computer program product comprising a non-transitory computer readable medium having a computer readable program embodied therein, wherein the computer readable program, when executed on a computing device, causes the computing device to:
receive data pertaining to one or more Agile project accounts, wherein the data is received by:
one-time seeding of header attributes pertaining to the one or more Agile project accounts; and
receiving periodic updates of performance parameters pertaining to the one or more Agile project accounts;
register, the one or more Agile project accounts, in a Knowledge Repository, for initial master data setup and for the periodic updates being received;
update, the Knowledge Repository with the received data by:
processing the received data asynchronously, wherein the processing comprises parsing key-value pairs comprised therein, and wherein the keys are fields and the values correspond to the header attributes and the performance parameters;
validating the values prior to sending through an Application Programming Interface (API) for updating the Knowledge Repository;
dynamically constructing a set of query language statements based on the validated values; and
executing the set of query language statements to update the Knowledge Repository with the validated values;
train one or more machine learning models using the validated values; and
interactively generate a potential location independent Agile delivery model, using a visual modeling technique, wherein the potential location independent Agile delivery model is interactively generated by:
self-registering a new project account upon receiving the header attributes, wherein at least some of the header attributes serve as constraints for generation of a new location independent Agile delivery model;
dynamically presenting to a user, a palette based user interface comprising a plurality of pre-configured meta-models, selectable components and interconnections thereof;
displaying a minimum set of selectable components based on a user selected instantiation of one of the plurality of pre-configured meta-models;
dynamically updating a compliance indicator in response to every drag or drop of the components being selected that generates a corresponding potential location independent Agile delivery model by optimally managing the constraints, wherein the compliance indicator is indicative of a degree of compliance with Agile principles; and identifying a potential location independent Agile delivery model having at least a user-defined minimum degree of compliance with Agile principles as the new location independent Agile delivery model; and perform at least one of:

initiating evaluation of the new location independent Agile delivery model using the trained one or more machine learning models to output a set of the performance parameters of the new location independent Agile delivery model, wherein the performance parameters are indicative of a degree of optimization of the new location independent Agile delivery model; and outputting a best match for the new location independent Agile delivery model amongst one or more Agile delivery models corresponding to the one or more Agile accounts using either a regression method or a nearest neighbor method.

* * * * *